United States Patent [19]

Yoneyama

[11] Patent Number: 5,801,877
[45] Date of Patent: Sep. 1, 1998

[54] OPTICAL FIBER AMPLIFIER FOR SUPERIMPOSING A SUB-SIGNAL

[75] Inventor: Kenichi Yoneyama, Tokyo, Japan

[73] Assignee: NEC Corporation, Tokyo, Japan

[21] Appl. No.: 672,701

[22] Filed: Jun. 27, 1996

[30] Foreign Application Priority Data

Jul. 6, 1996 [JP] Japan .................. 7-170578

[51] Int. Cl.⁶ .............. H04B 10/17; H04S 3/17
[52] U.S. Cl. .............. 359/341; 359/134; 359/160; 359/337
[58] Field of Search .............. 359/110, 134, 359/160, 337, 341

[56] References Cited

U.S. PATENT DOCUMENTS

| | | | |
|---|---|---|---|
| 4,955,081 | 9/1990 | Takahashi | 375/17 |
| 5,226,051 | 7/1993 | Chan et al. | 372/10 |
| 5,383,046 | 1/1995 | Tomofugi et al. | 359/176 |
| 5,394,265 | 2/1995 | Nagel et al. | 359/341 |
| 5,475,529 | 12/1995 | Takatu et al. | 359/341 |
| 5,515,192 | 5/1996 | Watanabe | 359/341 |

FOREIGN PATENT DOCUMENTS

0449475A2 10/1991 European Pat. Off. .
0630083A1 12/1994 European Pat. Off. .
4003028 1/1992 Japan .
4246930 9/1992 Japan .

*Primary Examiner*—Nelson Moskowitz
*Attorney, Agent, or Firm*—Whitham Curtis & Whitham

[57] ABSTRACT

An optical fiber amplifier including, in addition to an amplification medium for amplifying signal light, an excitation light source which generates excitation light to be input into the amplification medium and a photocoupler for coupling the excitation light to the amplification medium, a modulator for amplitude the excitation light, a sub-signal generator for generating a sub-signal which is superimposed on the excitation light for amplitude modulation and a frequency filter for converting the frequency characteristic of the sub-signal to input it to the the modulator means, for superimposing the sub-signal due to change in gain of the amplification medium for intensity modulation of the excitation light. High-frequency components of the sub-signal are previously emphasized through the frequency filter, and the excitation light is amplitude-modulated by the sub-signal with the emphasized high-frequency components, to superimpose the satisfactory, waveform distortion-free sub-signal on the signal light.

18 Claims, 3 Drawing Sheets

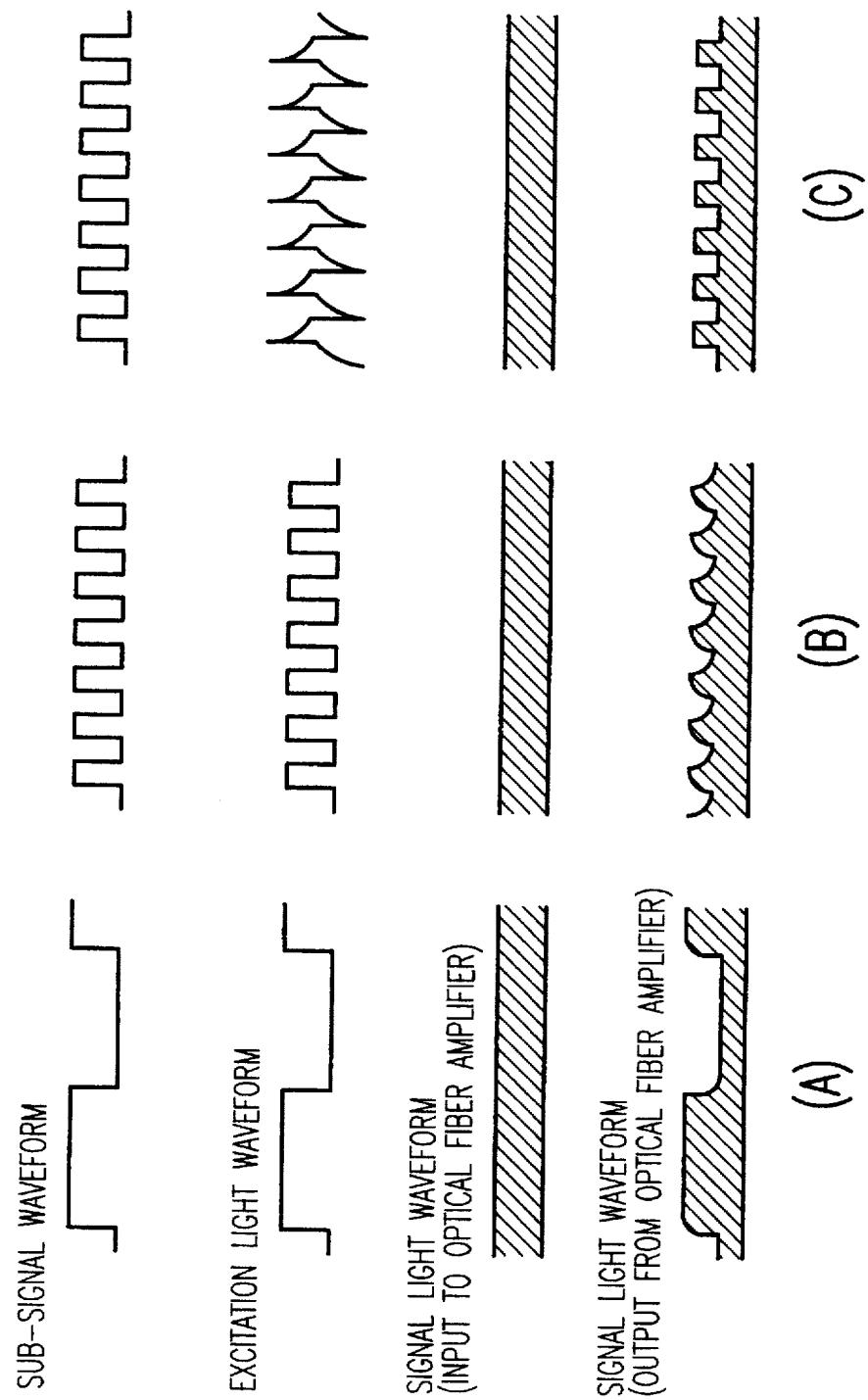

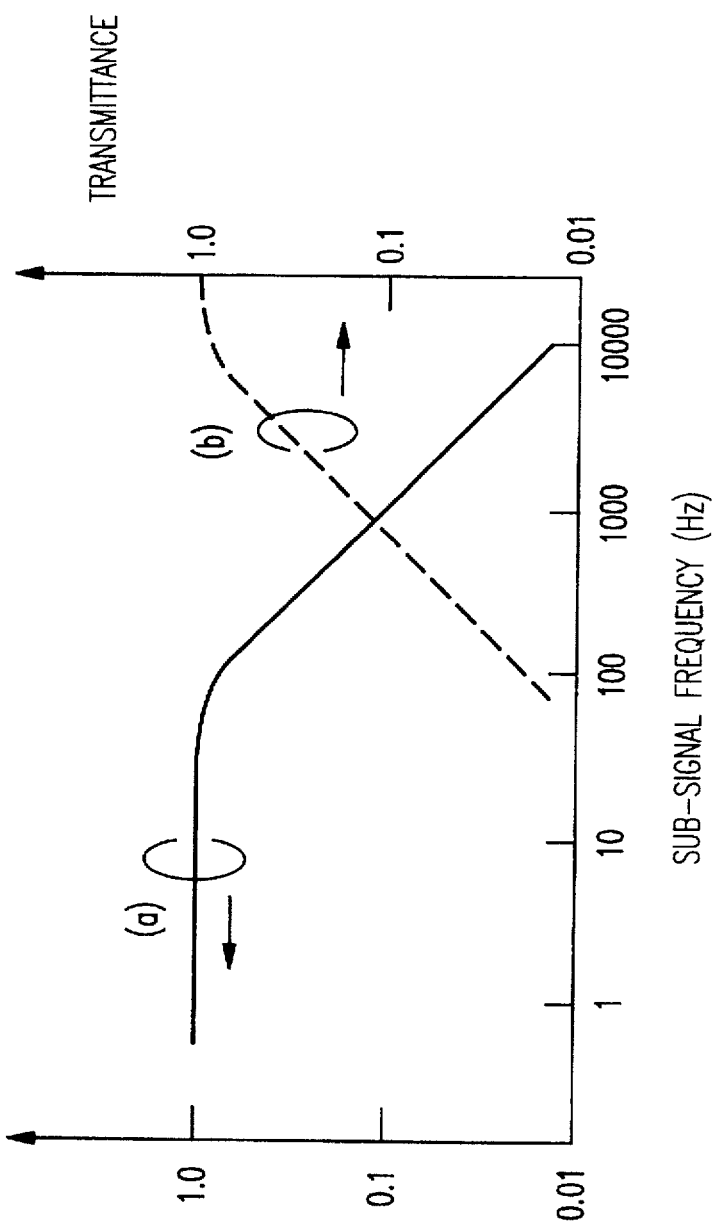

OPTICAL FIBER AMPLIFIER FOR SUPERIMPOSING A SUB-SIGNAL

BACKGROUND OF THE INVENTION

1. FIELD OF THE INVENTION

This invention relates to an optical fiber amplifier for amplifying signal light, and more particularly to an optical fiber amplifier capable of superimposing sub-signals on original signals.

2. DESCRIPTION OF RELATED ART

Optical fiber amplifiers of the prior art are equipped with erbium-doped optical fibers (EDF), excitation light sources for generating excitation light, and optical coupler for multiplexing signal light and the excitation light into the erbium-doped optical fiber. In addition, they are further provided with optical isolators in order to avoid the influence of returning light from points of reflection such as connection sections.

Optical fiber amplifiers of the prior art will now be described with reference to FIG. 1.

With conventional optical fiber amplifiers composed of erbium-doped optical fibers, signal light has a wavelength in the 1.55 μm band, and excitation light has a wavelength in the 0.98 μm band or the 1.48 μm band. Accordingly, in order to efficiently input excitation light into an erbium-doped optical fiber 1 without losing the signal light, an optical wavelength division multiplexer is used as an optical coupler.

The signal light which has entered the erbium-doped optical fiber 1 is optically amplified through the erbium-doped optical fiber 1 by induced emission and outputted. Here, a sub-signal is superimposed on the original signal and is then outputted in some cases. To superimpose a sub-signal on an original signal according to the prior art, a sub-signal which is an electric signal generated through a sub-signal generating circuit 7 is converted into an intensity pulse current signal through an LD current control circuit 5 and then injected into a semiconductor laser which forms an excitation source to output excitation light pulse-modulated by the sub-signal.

With optical fiber amplifiers according to the prior art, pulse modulation of excitation light by sub-signals results in change in gain of the optical fiber amplifiers. This offers an advantage in that the pulse-modulation of the sub-signals is superimposed on the signal light to be amplified. Therefore, this may be utilized as modulating means when sub-signals are transmitted with transmitting apparatuses, etc. For example, a sub-signal generated through the sub-signal generating circuit 7 is inputted to the LD current control circuit 5 which controls the current of the excitation source 4. The current which is applied across the excitation source 4 may be amplitude-modulated to superimpose the amplitude modulation of the sub-signal on the excitation light.

This conventional simple method for superimposing sub-signals on excitation light, however, causes distortion of the amplified optical signals. This has resulted in the problem of seriously lowered transmission quality.

When such distorted sub-signals are transmitted, the degree of modulation of the sub-signals must be increased to effect reliable detection of the sub-signals, and thus the transmission quality of the signal light is seriously lowered.

SUMMARY OF THE INVENTION

It is an object of this invention to provide an optical fiber amplifier which allows superimposition of sub-signals without degrading transmission quality of the signal light itself.

The optical fiber amplifier according to this invention is equipped with an amplification medium for amplifying signal light by absorption of excitation light, an excitation source which generates the excitation light to excite the amplification medium, and an optical coupler for inputting the excitation light into the amplification medium. The basic configuration is further provided with a modulating circuit for amplitude-modulating the excitation light which is outputted by the excitation source, a sub-signal generating circuit for generating a sub-signal which is superimposed on the excitation light for amplitude modulation, and a frequency filter for converting the frequency characteristic of the sub-signal to input it to the modulating circuit. The optical fiber amplifier according to this invention is also characterized in that the sub-signal is superimposed by change in the gain of the optical amplification medium for amplitude modulation of the excitation light.

This invention is further characterized by use of a differentiating circuit as the frequency filter. In addition, the frequency characteristic of the frequency filter serves to compensate the frequency characteristic of the amplification medium due to change in its gain, for the frequency of the sub-signal for amplitude-modulating the excitation light.

According to the present invention, high-frequency components of the sub-signal are previously emphasized through the frequency filter, and the excitation light is in turn pulse-modulated by the sub-signal with the pre-emphasized high-frequency components. This results in superimposition of a satisfactory, waveform distortion-free sub-signal on signal light.

BRIEF DESCRIPTION OF THE DRAWINGS

The above and other objects, features and advantages of this invention will become more apparent from the following detailed description when taken in conjunction with the accompanying drawings, wherein:

FIGS. 3(a)–3(c) are a view illustrative of sub-signal waveforms observed in various sections in the optical fiber amplifier according to this invention; and FIG. 4 is a view illustrative of an example of the frequency characteristic of an erbium-doped optical fiber amplifier for modulated excitation light.

DETAILED DESCRIPTION OF THE PREFERRED EMBODIMENTS

Prior to explanation of the optical fiber amplifier according to this invention, optical fiber amplifiers of the prior art will now be described again, but in more detail, in order to facilitate understanding of the invention.

Figure 1:
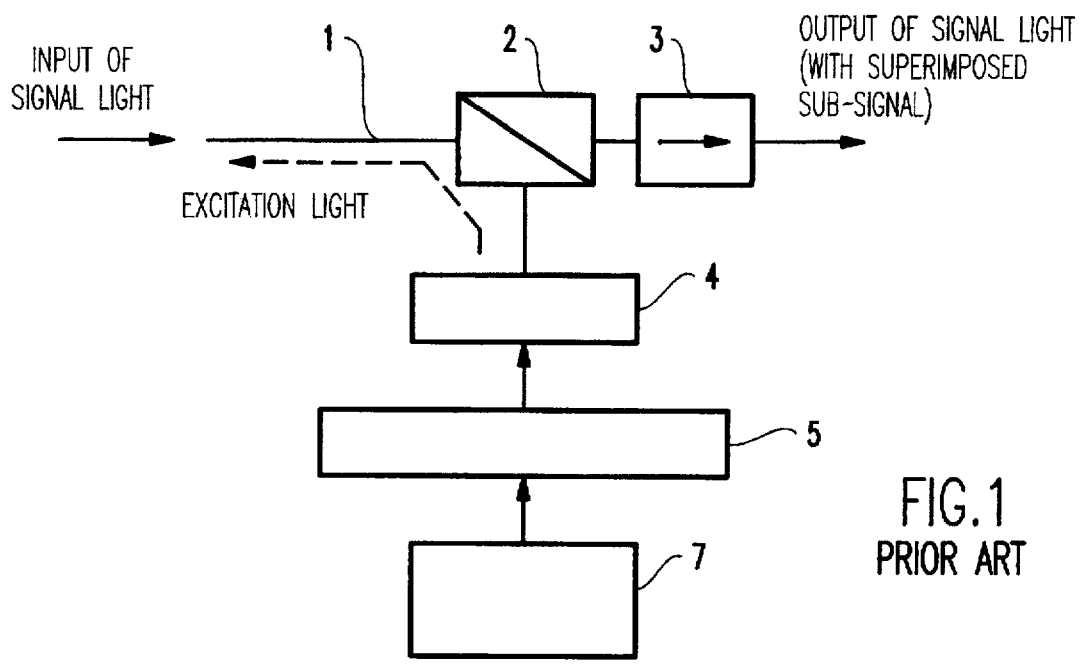
FIG. 1 is a view illustrative of the configuration of an embodiment of the optical fiber amplifier according to the prior art.

FIG. 1 illustrates an example of the configuration of a conventional optical fiber amplifier. The optical fiber used for amplification in this example is an erbium-doped optical fiber 1. Excitation light is inputted into the erbium-doped optical fiber 1 from the rear.

In the conventional optical fiber amplifier, an optical coupler 2 is connected to the erbium-doped optical fiber 1, as shown in FIG. 1. An excitation light source 4 is connected to the other end of the optical coupler 2. The excitation light outputted from the excitation light source 4 is introduced to the erbium-doped optical fiber 1 from the rear via the optical coupler 2.

In order to prevent the amplified light from returning toward the front, an optical isolator 3 is placed behind the optical coupler 2. Here, with conventional optical fiber amplifiers composed of erbium-doped optical fibers, signal light has a wavelength in the 1.55 μm band, and excitation light has a wavelength in the 0.98 μm band or the 1.48 μm band. Accordingly, in order to efficiently input excitation light into an erbium-doped optical fiber 1 without losing the signal light, a wavelength division multiplexer (WDM) is used as an optical coupler.

The signal light which has entered the erbium-doped optical fiber 1 is optically amplified through the erbium-doped optical fiber 1 by induced emission and outputted. Here, in some cases, a sub-signal is superimposed on the original signal and is then outputted. To superimpose a sub-signal on an original signal according to the prior art, a sub-signal which is an electric signal generated through a sub-signal generating circuit 7 is converted into an amplitude-modulated current signal through an LD current control circuit 5 and then injected into a semiconductor laser which forms an excitation light source 4 to output excitation light amplitude-modulated by the sub-signal.

With these optical fiber amplifiers, amplitude modulation of excitation light by sub-signals result in change in gain of the optical fiber amplifiers. This offers an advantage in that the amplitude modulation of the sub-signals is superimposed on the signal light to be amplified. Therefore, this may be utilized as modulating means when sub-signals are transmitted with transmitting apparatuses, etc. According to the illustrated prior art, a sub-signal generated through the sub-signal generating circuit 7 is inputted to the LD current control circuit 5 which controls the current of the excitation light source 4. This results in amplitude modulation of a current fed through the excitation light source 4, and thus in superimposition of the amplitude modulation of the sub-signal on the excitation light.

This conventional simple method for superimposing sub-signals on excitation light causes distortion of the amplified optical signals, and this has resulted in the problem of seriously lowered transmission quality.

When distorted sub-signals are transmitted, the degree of modulation of the sub-signals must be increased to effect reliable detection of the sub-signals. As a result, the transmission quality of the signal light is seriously lowered.

The reason for the lower transmission quality of signal light which results from the superimposition of sub-signals in the conventional optical fiber amplifier will now be analyzed.

Generally speaking, amplification media for amplifying signal light by induced emission, for example, erbium-doped optical fibers as used in the above example of the prior art, have natural time constants until excited by absorption of excitation light. Usually, the natural time constant is called "Life Time". Accordingly, in cases where the excitation light is amplitude-modulated at a lower speed than the natural time constants τ (sec.), the pulse modulation is efficiently superimposed on the signal light. However, conversely, when the excitation light is amplitude-modulated at a higher speed than the time constants, distorted amplitude modulation is superimposed on the signal light due to failure of the amplification media to follow the speed.

This is illustrated in FIGS. 3(a) and 3(b). FIG. 3(a) illustrates the behavior of sub-signals at low frequencies, whereas FIG. 3(b) illustrates the behavior of sub-signals at high frequencies. Since erbium-doped optical fibers have time constants τ of several msec., the waveform is abruptly distorted when the frequency of the superimposing sub-signal becomes several kHz or higher as shown in FIG. 3(b).

FIG. 4(a) illustrates the relationship between the frequencies of sub-signals for modulating the excitation light for erbium-doped optical fibers, and the degree of amplitude modulation superimposed on signal light. As shown by the drawing as well, the degree of the amplitude modulation superimposed on signal light decreases as the frequency of the sub-signal increases. This indicates an increase in the degree of distortion of the sub-signal waveform due to lack of high-frequency components.

As described above, with the conventional optical fiber amplifier, the waveforms of the sub-signals which are superimposed on signal light are distorted to lower the quality of the sub-signals in cases where the frequencies (and frequency components) of the sub-signals are greater than the inverse (1/τ) of the excitation time constant of the amplification medium.

The optical fiber amplifier according to this invention will now be explained in detail with reference to the drawings.

Figure 2:
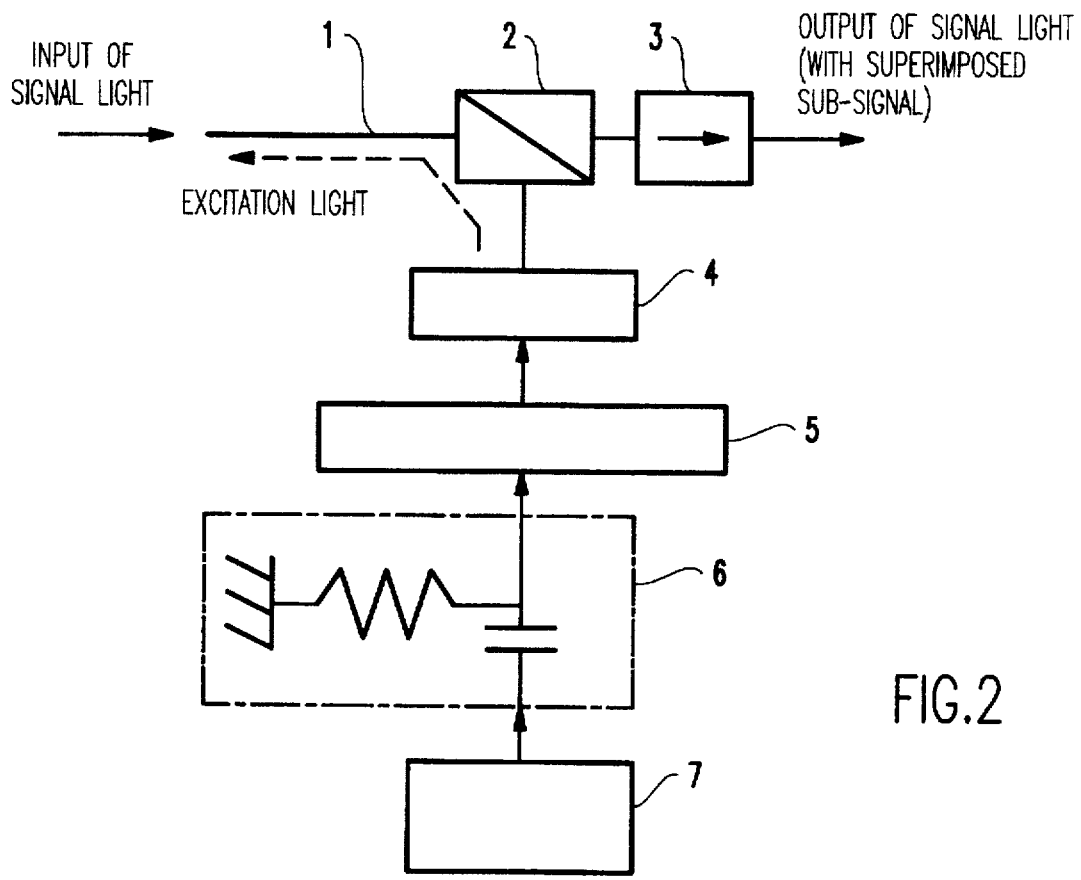
FIG. 2 is a view illustrative of the configuration of an embodiment of the optical fiber amplifier according to this invention.

FIG. 2 illustrates the configuration of an embodiment of the optical fiber amplifier according to this invention. According to this embodiment, a CR differentiating circuit of the simplest configuration is used as the frequency filter. Here, the capacitor C and the resistor R of the differentiating circuit 6 are optimally adjusted to match the frequency characteristic of an erbium-doped optical fiber 1, as the amplification medium, for modulated excitation light, that is, the inverse 1/τ of the excitation time constant. This results in amplitude modulation of the excitation light by the sub-signal previously emphasized (e.g., filtered) through the differentiating circuit 6. As a result, the waveform of the sub-signal superimposed on the signal light obtained by output from the optical fiber amplifier is free from distortion. τ he waveform of the sub-signal approaches its waveform just after being outputted from the sub-signal generating circuit 7.

The waveforms observed at this moment in various sections are shown in FIG. 3(c). The sub-signal outputted through the differentiating circuit 6 has a differential waveform due to amplitude modulation of the high-frequency components emphasis. Inputting excitation light amplitude-modulated by the high-frequency components emphasized sub-signal into the erbium-doped optical fiber 1 results in superimposition of amplitude modulation close to the original sub-signal waveform on the amplified signal light.

According to this embodiment, a differentiating circuit is used as the frequency filter, as shown in FIG. 2. The same effect is produced with a filter having a frequency characteristic which serves to compensate the frequency characteristic of the amplification medium for amplitude modulated excitation light as well.

FIG. 4(b) illustrates an example of the frequency filtering characteristic according to this embodiment. Here, the frequency filter is designed to have lower passage loss as the frequency increases, opposite to the frequency characteristic of the erbium-doped optical fiber FIG. 4(a). This allows compensation of the frequency characteristic of the erbium-doped optical fiber. Here, since the sub-signal has a lower amplitude due to loss produced by the frequency filtering, the sub-signal generating circuit must be designed with a higher output.

FIG. 4 illustrates an example of the frequency characteristic of an erbium-doped optical fiber amplifier for modulated excitation light. FIG. 4(a) illustrates the frequency characteristic of the erbium-doped optical fiber amplifier for modulated excitation light. FIG. 4(b) illustrates the frequency characteristic of the frequency filter as the transmittance.

With the configuration described above, the optical fiber amplifier according to this invention produces the effect of not only preventing distortion of the waveforms of amplitude-modulated sub-signals which are superimposed on signal light to improve the transmission quality of the sub-signals, but also minimizing the influence of the sub-signals on the signal light.

While this invention has been described in connection with certain preferred embodiments, it is to be understood that the subject matter encompassed by this invention is not to be limited to the specific embodiments. On the contrary, the subject matter of the invention is intended to include all alternatives, modifications and equivalents as can be included within the spirit and scope of the following claims.

What is claimed is:

1. An optical fiber amplifier comprising:
   an amplification medium for amplifying signal light by absorption of excitation light;
   an excitation light source which generates the excitation light to excite said amplification medium;
   photocoupling means for inputting said excitation light into said amplification medium;
   sub-signal generating means for generating a sub-signal;
   modulating means for modulating said excitation light based on said sub-signal; and
   a frequency filter for converting a frequency characteristic of said sub-signal to input it to said modulating means,
   wherein said frequency filter includes a high-frequency component modulator for previously emphasizing high-frequency components of the sub-signal.

2. An optical fiber amplifier as claimed in claim 1, wherein said frequency filter includes gain adjusting means for superimposing said sub-signal by changing a gain of said amplification medium for modulation of said excitation light.

3. An optical fiber amplifier as claimed in claim 1, wherein said frequency filter includes a differentiating circuit.

4. An optical fiber amplifier as claimed in claim 1, wherein said frequency filter has a frequency characteristic which compensates the frequency characteristic of said amplification medium due to change in its gain by an excitation light modulation, for the frequency of said sub-signal.

5. An optical fiber amplifier as claimed in claim 2, wherein said frequency filter has a frequency characteristic which compensates the frequency characteristic of said amplification medium due to change in its gain by an excitation light modulation, for the frequency of said sub-signal.

6. An optical fiber amplifier as claimed in claim 1, wherein said frequency filter comprises a capacitor-resistor differentiating circuit comprising a capacitor coupled to a resistor, said capacitor and said resistor being selectively adjusted to match said frequency characteristic of said amplification medium for modulated light.

7. An optical fiber amplifier as claimed in claim 6, wherein said frequency characteristic is matched to an inverse of an excitation time constant τ.

8. An optical fiber amplifier as claimed in claim 1, wherein said amplification medium comprises an erbium-doped optical fiber.

9. An optical fiber amplifier comprising:
   a medium for amplifying signal light by absorption of pumping light;
   a light source which generates the pumping light to excite said medium;
   a modulator for modulating said excitation light based on an external signal; and
   a filter for converting a frequency characteristic of said external signal to input it to said modulator,
   wherein said filter includes a high-frequency component modulator for previously emphasizing a high-frequency component of the external signal.

10. An optical fiber amplifier according to claim 9, further comprising a photocoupler for inputting said pumping light into said medium.

11. An optical fiber amplifier as claimed in claim 9, wherein said filter comprises a frequency filter.

12. An optical fiber amplifier as claimed in claim 11, further comprising an external signal generator for generating said external signal, wherein said external signal comprises a sub-signal.

13. An optical fiber amplifier as claimed in claim 9, wherein said filter comprises a frequency filter including gain adjusting means for superimposing said external signal by changing a gain of said medium for modulation of said pumping light.

14. An optical fiber amplifier as claimed in claim 9, wherein said filter includes a differentiating circuit.

15. An optical fiber amplifier as claimed in claim 9, wherein said filter comprises a frequency filter, said frequency filter having a frequency characteristic which compensates the frequency characteristic of said medium due to change in its gain by a pumping light modulation, for the frequency of said external signal.

16. An optical fiber amplifier as claimed in claim 9, wherein said filter has a frequency characteristic which compensates the frequency characteristic of said medium due to change in its gain by a pumping light modulation, for the frequency of said external signal.

17. An optical fiber amplifier as claimed in claim 9, wherein said filter comprises a capacitor-resistor differentiating circuit comprising a capacitor coupled to a resistor, said capacitor and said resistor being selectively adjusted to match said frequency characteristic of said medium for modulated light, and
   wherein said frequency characteristic is matched to an inverse of an excitation time constant τ.

18. An optical fiber amplifier as claimed in claim 9, wherein said medium comprises an erbium-doped optical fiber.

* * * * *

UNITED STATES PATENT AND TRADEMARK OFFICE
CERTIFICATE OF CORRECTION

PATENT NO. : 5,801,877
DATED : September 1, 1998
INVENTOR(S) : Kenichi Yoneyama

It is certified that error appears in the above-identified patent and that said Letters Patent is hereby corrected as shown below:

On the title page, item [30] Foreign Application Priority Data, change "Jul. 6, 1996" to --JUL. 6, 1995--.

Signed and Sealed this

First Day of December, 1998

Attest:

BRUCE LEHMAN

*Attesting Officer*  *Commissioner of Patents and Trademarks*